United States Patent
Wang et al.

(10) Patent No.: US 12,196,096 B2
(45) Date of Patent: Jan. 14, 2025

(54) COOLING DEVICE FOR THERMAL CONTROL CABLE OF TURBINE END BEARING OF COMBINED CYCLE UNIT

(71) Applicant: Huaneng Shanghai Combined Cycle Power Co, Ltd., Shanghai (CN)

(72) Inventors: Xuhanqing Wang, Shanghai (CN); Yongkang Wang, Shanghai (CN); Weijun Chu, Shanghai (CN); Yuchen Mao, Shanghai (CN)

( * ) Notice: Subject to any disclaimer, the term of this patent is extended or adjusted under 35 U.S.C. 154(b) by 0 days.

(21) Appl. No.: 17/973,562

(22) Filed: Oct. 26, 2022

(65) Prior Publication Data

US 2023/0133778 A1 May 4, 2023

(30) Foreign Application Priority Data

Oct. 29, 2021 (CN) .......................... 202111274473.7

(51) Int. Cl.
F01D 25/12 (2006.01)
(52) U.S. Cl.
CPC .................................. *F01D 25/125* (2013.01)
(58) Field of Classification Search
CPC ........ F01D 25/125; F01D 25/08; F01D 25/12; F01D 9/065; F01D 17/08; F05D 2260/20;
(Continued)

(56) References Cited

U.S. PATENT DOCUMENTS

| 2,940,258 | A | * | 6/1960 | Lombard | .............. | F01D 9/065 |
| | | | | | | 62/505 |
| 3,788,143 | A | * | 1/1974 | Gabriel | .............. | F01D 17/085 |
| | | | | | | 374/E13.006 |

(Continued)

FOREIGN PATENT DOCUMENTS

| CA | 2888673 A1 | * | 5/2014 | ............. | F01D 21/00 |
| WO | WO-2015017080 A1 | * | 2/2015 | ............. | F01D 15/00 |

*Primary Examiner* — David E Sosnowski
*Assistant Examiner* — Wayne A Lambert
(74) *Attorney, Agent, or Firm* — Addison D. Ault; IPGentleman Intellectual Property Services, LLC

(57) ABSTRACT

The invention relates to a cooling device for thermal control cable of turbine end bearing of combined cycle unit, which comprises a protective sleeve, a cooling air pipeline of 1 W thermal control cable and an inlet valve, wherein, the protective sleeve is ganged outside the thermal control cable, the air outlet of the cooling air pipeline of 1 W thermal control cable is connected to the gap between the protective sleeve and the thermal control cable, the cooling air flows along the cooling air pipeline of 1 W thermal control cable into the space between the protective sleeve and the thermal control cable, and the air inlet valve is arranged on the cooling air pipeline of 1 W thermal control cable to connect and disconnect the cooling air pipeline of 1 W thermal control cable. Compared with the prior art, in the invention, protective sleeve is arranged on the thermal control cable, and the cooling air is introduced into the gap between the protective sleeve and the thermal control cable, thus avoiding direct contact between the thermal control cable and the hot air discharged from the turbine exhaust outlet. In addition, the cooling air reduces the ambient temperature in the protective sleeve and produces good cooling effect, which effectively guarantees the safety of the thermal control cable, ensures the safe operation of the unit, and greatly improves safety and reliability.

7 Claims, 1 Drawing Sheet

(58) Field of Classification Search
CPC .. Y02E 20/16; F02C 7/12; F02C 7/125; F02C 7/16; F02C 7/18; F02C 7/185
See application file for complete search history.

(56) References Cited

U.S. PATENT DOCUMENTS

| | | | | |
|---|---|---|---|---|
| 4,747,700 A * | 5/1988 | Lenz | ............... | G01K 1/12 374/E1.016 |
| 4,948,264 A * | 8/1990 | Hook, Jr. | ............... | G01K 13/02 374/138 |
| 5,348,395 A * | 9/1994 | Corr, II | ............... | G01K 1/12 374/E1.016 |
| 5,388,960 A * | 2/1995 | Suzuki | ............... | F01D 25/12 415/176 |
| 6,020,552 A * | 2/2000 | Rickman | ............... | G01K 13/022 374/208 |
| 6,325,535 B1 * | 12/2001 | Gibson | ............... | G01K 1/12 374/E1.016 |
| 6,431,824 B2 * | 8/2002 | Schotsch | ............... | F01D 9/02 415/118 |
| 6,546,735 B1 * | 4/2003 | Moniz | ............... | F01D 21/003 60/773 |
| 8,033,719 B2 * | 10/2011 | Beutin | ............... | G01K 13/02 374/208 |
| 2008/0314573 A1 * | 12/2008 | Schwarz | ............... | F02K 3/06 165/166 |
| 2009/0175316 A1 * | 7/2009 | Beutin | ............... | F01D 17/08 374/158 |
| 2010/0054927 A1 * | 3/2010 | Almstedt | ............... | F01D 25/162 415/180 |
| 2010/0158074 A1 * | 6/2010 | Fortier | ............... | G01L 19/0092 374/208 |
| 2014/0119913 A1 * | 5/2014 | Demitraszek, Sr. | .... | F01D 25/16 415/229 |
| 2015/0033757 A1 * | 2/2015 | White | ............... | F01D 17/02 60/803 |
| 2017/0022900 A1 * | 1/2017 | Miller | ............... | F02C 7/16 |
| 2017/0107854 A1 * | 4/2017 | Friedl | ............... | F02K 1/805 |
| 2018/0119575 A1 * | 5/2018 | Bouiller | ............... | F01D 25/18 |
| 2019/0072006 A1 * | 3/2019 | Duffy | ............... | F01K 23/101 |
| 2024/0133344 A1 * | 4/2024 | Prakash | ............... | F02C 7/25 |

* cited by examiner

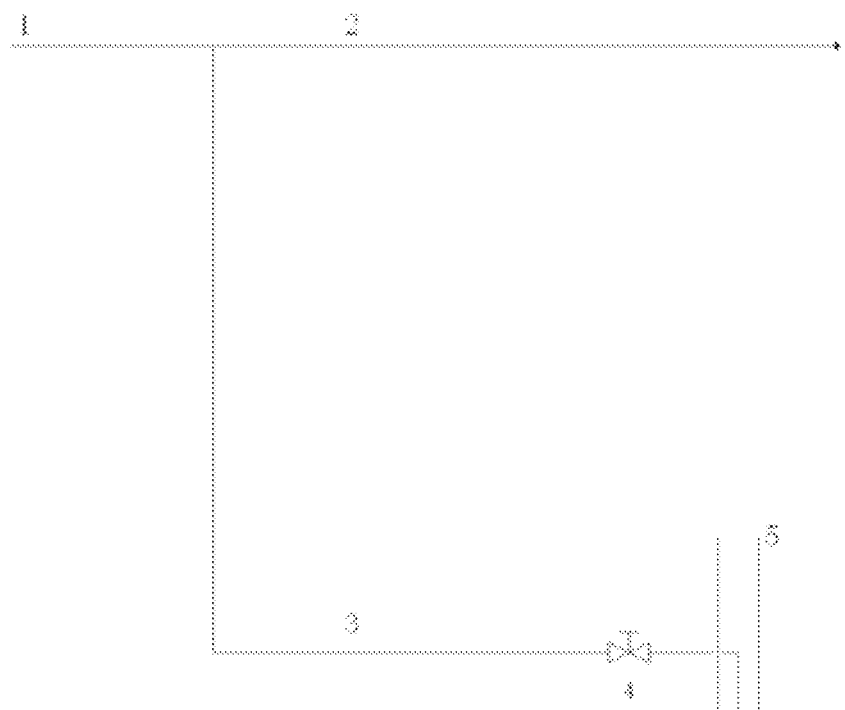

COOLING DEVICE FOR THERMAL CONTROL CABLE OF TURBINE END BEARING OF COMBINED CYCLE UNIT

TECHNICAL FIELD

The invention relates to the technical field of combined cycle units, particularly to a cooling device for thermal control cable of turbine end bearing of combined cycle unit.

BACKGROUND ART

The turbine is a machine that converts the energy and mechanical energy contained in the fluid medium into each other. The turbine is an important part of the gas-steam combined cycle unit.

A (1 W) thermal control cable nuns out at the oil return pipe of the jacking shaft of the turbine end bearing. The thermal control cable is used to detect the oil temperature at the oil return pipe and send the oil temperature to the upper computer in the monitoring room to realize real-time monitoring of the oil temperature and ensure the safe operation of the unit. However, due to the structural design of the turbine, the thermal control cable is located near the exhaust outlet of the turbine, and the high-temperature air discharged from the turbine blows directly on the thermal control cable, which is easy to damage the thermal control cable or lead to abnormal measurement data transmission of the relevant thermal control cable, thus affecting the oil temperature detection at the turbine oil return pipe. In addition, an alarm is given when the oil temperature data is abnormal, affecting the safe and stable operation of the unit, and reducing the reliability of power generation equipment.

Content of Invention

Since the position of the thermal control cable is fixed and cannot be changed, the thermal control cable can only be protected by thermal isolation or cooling. In the research and analysis, the inventor found that because the thermal control cable itself also generates heat, covering the thermal control cable with thermal insulation materials cannot completely prevent the thermal control cable from being burned so cooling medium is connected to cool the thermal control cable. The invention aims to provide a cooling device for thermal control cable of turbine end bearing of combined cycle unit to overcome the defects of the prior art.

The purpose of the invention can be achieved by the following technical solution:

A cooling device for thermal control cable of turbine end bearing of combined cycle unit comprises a protective sleeve, a cooling air pipeline of 1 W thermal control cable and an inlet valve:

The protective sleeve is arranged outside the thermal control cable, the air outlet of the cooling air pipeline of 1 W thermal control cable is connected to the gap between the protective sleeve and the thermal control cable, the cooling air flows along the cooling air pipeline of 1 W thermal control cable into the space between the protective sleeve and the thermal control cable, and the air inlet valve is arranged on the cooling air pipeline of 1 W thermal control cable to connect and disconnect the cooling air pipeline of 1 W thermal control cable.

Furthermore, the protective sleeve is a stainless steel sleeve.

Furthermore, the protective sleeve is wrapped with a first thermal insulation layer.

Furthermore, the thermal control cable is wrapped with a second thermal insulation layer.

Furthermore, the air inlet of the cooling air pipeline of 1 W thermal control cable is connected to the flame detection cooling air header of the combined cycle unit.

Furthermore, the flame detection cooling air header is provided with a three-way valve which is respectively connected with the cooling air pipeline of 1 W thermal control cable and a flame detection cooling air pipeline. The cooling air in the flame detection cooling air header flows into the cooling air pipeline of 1 W thermal control cable and the flame detection cooling air pipeline through the three-way valve.

Furthermore, the three-way valve is a solenoid valve.

Furthermore, the invention also comprises a controller and a drive mechanism, wherein the controller is communicated with the drive mechanism, and the drive mechanism is used to open and close the inlet valve.

Furthermore, the bottom of the protective sleeve is the outlet where the thermal control cable comes out from the turbine oil return pipe, and the top of the protective sleeve is connected to the atmosphere.

Furthermore, the end of the cooling air pipe of 1 W thermal control cable, which extends into the gap between the protective sleeve and the thermal control cable, forms an elbow, and the cooling air flows along the elbow into the gap between the protective sleeve and the thermal control cable, and toward the bottom of the protective sleeve.

Compared with the prior art, the invention has the following advantages:

(1) The cooling effect is outstanding: the protective sleeve is sleeved on the thermal control cable, and the cooling air is introduced into the gap between the protective sleeve and the thermal control cable, avoiding direct contact between the thermal control cable and the hot air discharged from the turbine exhaust outlet. The cooling air reduces the ambient temperature in the protective sleeve, effectively protecting the safety of the thermal control cable and ensuring the safe operation of the unit, thus greatly improving the safety and reliability of the unit.

(2) Simple system structure: only one pipeline is required to be added on the fire detection cooling air header as the cooling air pipeline of the 1 W thermal control cable, without changing the original system structure of the unit, thus, the system is simple to reform and convenient to operate and maintain with low investment cost, easy operation and maintenance and high economic benefits.

(3) The thermal control cable is placed in the protective sleeve which is covered with a first thermal insulation layer, and the thermal control cable is covered with a second thermal insulation layer, avoiding the direct blowing of hot air on the thermal control cable, and in addition, the protective sleeve is isolated from the hot air, thus, the cooling effect is better.

FIGURES

FIG. 1 shows the structure of the invention;

Marks of the figure: 1. flame detection cooling air header, 2. flame detection cooling air pipeline, 3. cooling air pipeline of 1 W thermal control cable, 4. inlet valve and 5. protective sleeve.

DESCRIPTION OF PREFERRED EMBODIMENTS

The embodiment and specific operation process of the invention are described in detail below in combination with the drawing and specific embodiment. The embodiment is implemented on the premise of the technical solution of the invention, bit the protection scope of the invention is not limited to the following embodiment.

In the drawing, the components with the same structure are represented by the same number, and the components with similar structures or functions are represented by similar numbers. The size and thickness of each component shown in the drawing are arbitrarily given, because the invention does not define the size and thickness of each component. In order to make the diagram clearer, some parts are enlarged appropriately in the drawing.

Embodiment 1

A cooling device for thermal control cable of turbine end bearing of combined cycle unit, as shown in FIG. 1, comprises a protective sleeve 5, a cooling air pipeline 3 of 1 W thermal control cable and an inlet valve 4

The protective sleeve 5 is arranged outside the thermal control cable, the air outlet of the cooling air pipeline 3 of 1 W thermal control cable is connected to the gap between the protective sleeve 5 and the thermal control cable, the cooling air flows along the cooling air pipeline 3 of 1 W thermal control cable into the space between the protective sleeve 5 and the thermal control cable, and the air inlet valve 4 is arranged on the cooling air pipeline 3 of 1 W thermal control cable to connect and disconnect the cooling air pipeline 3 of 1 W thermal control cable.

In this embodiment, not any separate cooling circuit is arranged, but the air inlet of the cooling air pipeline 3 of 1 W thermal control cable is connected to the fire detection cooling air header 1 of the combined cycle unit. The fire detection cooling air header 1 is equipped with a three-way valve, which is respectively connected to the cooling air pipeline 3 of 1 W thermal control cable and the fire detection cooling air pipeline 2. The cooling air in the fire detection cooling air header 1 flows into the cooling air pipeline 3 of 1 W thermal control cable and the fire detection cooling air pipeline 2 through the three-way valve. In this way, the flame detection cooling air header 1 of the unit is divided into two parts. One part is still used for supplying the cooling air to the flame detection probe of the gas turbine, while the other part is connected to the cooling air pipeline 3 of 1 W thermal control cable for cooling the thermal control cable. Simplicity and low cost are realized in this way. In other embodiments, a separate cooling circuit can also be arranged to cool the thermal control cable.

In this embodiment, the three-way valve is a solenoid valve, which can facilitate the on-off of the pipeline, so as to improve the automation level. A controller and a drive mechanism are also arranged in communication connection, and the drive mechanism is used to open and close the air inlet valve 4.

During the normal operation of the unit, the inlet valve 4 is kept fully open, and the cooling air enters the gap between the protective sleeve 5 and the thermal control cable, constantly cooling the thermal control cable in the protective sleeve 5, and reducing the ambient temperature of the thermal control cable. When the cooling device of the thermal control cable or the thermal control cable of the bearing at the turbine end needs to be overhauled the inlet valve 4 can be closed to isolate the cooling air.

The bottom of the protective sleeve 5 is the outlet where the thermal control cable comes out from the turbine oil return pipe, and the top of the protective sleeve 5, where the cooling air flows out to the outside, is connected to the atmosphere. In order to achieve better cooling effect, one end of the cooling air pipeline 3 of 1 W thermal control cable extends into the gap between the protective sleeve 5 and the thermal control cable to form an elbow. The cooling air flows along the elbow into the gap between the protective sleeve 5 and the thermal control cable, and toward the bottom of the protective sleeve 5. The temperature of the position where the thermal control cable nuns out of the turbine oil return pipe is high, and the elbow makes the cooling air directly blow the position where the thermal control cable mass out of the turbine oil return pipe, and the cooling effect is better.

The interior of the protective sleeve 5 is the space for cooling the thermal control cable. In this embodiment, the protective sleeve 5 is a stainless steel sleeve, but the protective sleeve 5 can be adjusted as required in other embodiments.

The protective sleeve 5 is wrapped with a first thermal insulation layer, and the thermal control cable is wrapped with a second thermal insulation layer.

At first, wrapping the thermal control cable surface with the second thermal insulation layer, and placing the thermal control cable in the protective sleeve 5 can avoid the direct contact between the thermal control cable and the hot air discharged from the turbine exhaust outlet; and secondly, wrapping the first thermal insulation layer on the outside of the protective sleeve 5 isolates the protective sleeve 5 from the hot air, so as to prevent the direct blowing of hot air into the protective sleeve 5 and increase the air temperature inside the protective sleeve 5. The first thermal insulation layer and the second thermal insulation layer are made of thermal insulation materials, which can isolate hot air. The first thermal insulation layer and the second thermal insulation layer cooperate with the cooling air from the cooling air pipeline 3 of the 1 W thermal control cable to cool the thermal control cable, so that the thermal control cable is at a safe ambient temperature.

A preferred specific embodiment of the invention is described in detail above. It shall be understood that any ordinary technician in the art can make many modifications and changes according to the concept of the invention without any creative work. Therefore, any technical solution that can be obtained by any person skilled in the art according to the concept of the invention on the basis of the prior art through logical analysis, reasoning or limited experiments shall be within the scope of protection determined by the claims.

The invention claimed is:

1. A cooling device for thermal control cable of turbine end bearing of combined cycle unit is characterized by comprising a protective sleeve, a cooling air pipeline of the thermal control cable and an inlet valve;

wherein, the protective sleeve is arranged outside the thermal control cable, an air outlet of the cooling air pipeline of the thermal control cable is connected to a gap between the protective sleeve and the thermal control cable, cooling air flows along the cooling air pipeline of the thermal control cable into the gap between the protective sleeve and the thermal control cable, and the inlet valve is arranged on the cooling air pipeline of the thermal control cable to connect and disconnect the cooling air pipeline of the thermal control cable, wherein an air inlet of the cooling air pipeline of the thermal control cable is connected to a flame detection cooling air header, and the flame detection cooling air header is provided with a three-way valve which is respectively connected with the cooling air pipeline of the thermal control cable and a flame detection cooling air pipeline, the cooling air in the flame detection cooling air header flows into the cooling air pipeline of the thermal control cable and the flame detection cooling air pipeline through the three-way valve.

2. The cooling device for a thermal control cable of turbine end bearing of combined cycle unit according to claim 1 is characterized in that the protective sleeve is a stainless steel sleeve.

3. The cooling device for a thermal control cable of turbine end bearing of combined cycle unit according to claim 1 is characterized in that the protective sleeve is wrapped with a first thermal insulation layer.

4. The cooling device for a thermal control cable of turbine end bearing of combined cycle unit according to claim 1 is characterized in that the thermal control cable is wrapped with a second thermal insulation layer.

5. The cooling device for a thermal control cable of turbine end bearing of combined cycle unit according to claim 1 is characterized in that the three-way valve is a solenoid valve.

6. The cooling device for a thermal control cable of turbine end bearing of combined cycle unit according to claim 1 is characterized by also comprising a controller and a drive mechanism, wherein the controller is communicated with the drive mechanism, and the drive mechanism is used to open and close the inlet valve.

7. The cooling device for a thermal control cable of turbine end bearing of combined cycle unit according to claim 1 is characterized in that an end of the cooling air pipe of the thermal control cable, which extends into the gap between the protective sleeve and the thermal control cable, forms an elbow, and the cooling air flows along the elbow into the gap between the protective sleeve and the thermal control cable, and toward a bottom of the protective sleeve.

* * * * *